US006447826B1

(12) United States Patent
Matthews (10) Patent No.: US 6,447,826 B1
(45) Date of Patent: Sep. 10, 2002

(54) PACKAGING FOR MEAT AND FOODSTUFF

(75) Inventor: Andrew Ernest Matthews, Brisbane (AU)

(73) Assignees: Sealed Air (NZ) Limited, Hamilton (NZ); Meat Research Corporation, Sydney (AU)

( * ) Notice: Subject to any disclaimer, the term of this patent is extended or adjusted under 35 U.S.C. 154(b) by 0 days.

(21) Appl. No.: 08/793,898

(22) PCT Filed: Sep. 13, 1995

(86) PCT No.: PCT/NZ95/00083

§ 371 (c)(1),
(2), (4) Date: Mar. 12, 1997

(87) PCT Pub. No.: WO96/08424

PCT Pub. Date: Mar. 21, 1996

(30) Foreign Application Priority Data

Sep. 14, 1994 (NZ) .................................................. 264453
Dec. 21, 1994 (NZ) .................................................. 270248

(51) Int. Cl.[7] .............................................. A21D 10/02
(52) U.S. Cl. ...................... 426/126; 426/129; 426/396; 426/410; 426/413; 426/415; 426/418; 53/432; 53/434
(58) Field of Search .................................. 426/129, 124, 426/396, 413, 410, 415, 418; 53/432, 434

(56) References Cited

U.S. PATENT DOCUMENTS

| | | | | | |
|---|---|---|---|---|---|
| 2,825,651 A | * | 3/1958 | Loo et al. | .................... | 426/124 |
| 3,419,400 A | * | 12/1968 | Hayhurst | .................... | 426/129 |
| 3,502,485 A | | 3/1970 | Illouze | | |
| 3,574,642 A | * | 4/1971 | Weinke | ..................... | 426/129 |
| 3,670,874 A | * | 6/1972 | Brunner | ...................... | 426/129 |
| 4,055,672 A | * | 10/1977 | Hirsch et al. | .............. | 426/129 |

(List continued on next page.)

FOREIGN PATENT DOCUMENTS

| | | | | |
|---|---|---|---|---|
| EP | 0128795 | 3/1988 | | |
| EP | 0468880 B1 | 1/1992 | | |
| EP | 0527228 A1 | 2/1993 | | |
| EP | 0698563 A1 | 2/1996 | | |
| FR | 2165761 | 8/1973 | | |
| GB | 1186978 | * 4/1970 | ................. | 426/129 |
| JP | 55-135542 | * 10/1980 | ................. | 426/124 |
| JP | 58-107134 | * 6/1983 | ................. | 426/124 |
| JP | 58-183033 | * 10/1983 | ................. | 426/124 |
| JP | 60034128 | 2/1985 | | |
| JP | 60-221031 | * 10/1985 | ................. | 426/124 |
| JP | 2-219772 | * 9/1990 | ................. | 426/124 |
| JP | 4-201878 | * 7/1992 | ................. | 426/124 |
| WO | WO 90/01005 | 2/1990 | | |
| ZA | 92 4298 | 6/1992 | | |

OTHER PUBLICATIONS

Food & Drug Packaging 6/88 pp. 4, 34.*

Zhao, Yanyun; Wells, John Henry, and McMillin, Kenneth W., Applications of Dynamic Modified Atmosphere Packaging Systems for Fresh Red Meats: Review, *Journal of Muscle Foods* 5 (1994) pp. 299–328).

Benedict, et al., Use of In–Package Controlled Atmospheres for Extending the Shelf–Life of Meat Products *J. Agric. Food Chem.*, vol. 23, No. 6, 1975.

C. O. Gill, Controlled Atmosphere Packaging of Chilled Meat, *Food Control,* Apr. 1990, pp. 74–78.

*Primary Examiner*—Steve Weinstein
(74) *Attorney, Agent, or Firm*—Alston & Bird LLP (57) ABSTRACT

Methodology for packaging and packages for meat or other foodstuffs in a carbon dioxide rich low oxygen environment by including without the packages carbon dioxide generating material and oxygen removing material where the production of carbon dioxide is not dependent upon removal of oxygen.

22 Claims, 5 Drawing Sheets

U.S. PATENT DOCUMENTS

| | | |
|---|---|---|
| 4,299,719 A | 11/1981 | Aoki et al. |
| 4,384,972 A | 5/1983 | Nakamura et al. |
| 4,548,852 A | 10/1985 | Mitchell |
| 4,642,239 A * | 2/1987 | Ferrar et al. ............... 426/129 |
| 4,664,922 A * | 5/1987 | Leon ......................... 426/129 |
| 4,683,139 A * | 7/1987 | Cheng ....................... 426/129 |
| 4,685,274 A | 8/1987 | Garwood |
| 4,762,722 A | 8/1988 | Izumimoto et al. |
| 4,840,271 A * | 6/1989 | Garwood ................... 426/129 |
| 4,856,650 A | 8/1989 | Inoue |
| 5,124,164 A * | 6/1992 | Matsumoto et al. ........ 426/124 |
| 5,241,149 A | 8/1993 | Watanabe et al. |
| 5,731,023 A * | 3/1998 | Milani ...................... 426/129 |

* cited by examiner fig.5.

PACKAGING FOR MEAT AND FOODSTUFF

TECHNICAL FIELD

The present invention is directed to the field of packaging. More specifically it deals with carbon dioxide releasing systems in conjunction with systems capable of absorbing oxygen. Bag and sachets incorporating such components are also discussed. Modified packages associated with the use of such systems are also discussed as are methods of use associated with the present invention.

BACKGROUND ART

The description of the present invention will be discussed predominantly in relation to meat products whose associated packaging problems are typical of those which the present invention considers. However it should be appreciated that the present invention can also be applied to other foodstuffs and articles to be packaged.

More specifically, and for simplicity of description, the problems associated with chilled and fresh meat will be discussed as the problems associated with these products are perhaps the most demanding. Consumer perception is that a red meat product is a fresh meat product and therefore preferable to discoloured products. Unfortunately, for fresh and chilled meats, storage under conditions where oxygen is present results in gradual browning of the meat. While in many cases (short term storage) the product is still acceptable, the consumer is deterred by the brownish appearance of the meat which they associate with a spoiled product.

Where there is longer term storage of meat products, the presence of oxygen can result in not only the browning of the meat but subsequent spoilage. Accordingly packages for long term storage of meat generally comprise an oxygen impermeable barrier film. Often the packages are evacuated or packed under a modified atmosphere.

Vacuum packaging is not generally considered appropriate for the retail display of chilled red meat, because of the meat's purple coloration. Low oxygen modified atmosphere systems are also not appropriate for the same reasons.

High oxygen/low carbon dioxide modified atmosphere systems are successfully used for retail cuts of red meat, but in this case, the storage life is low due to oxygen spoilage.

Recently a packaging system known as low oxygen/high carbon dioxide packaging has become very popular. The system has been directed mainly at non-retail ready markets, as the primal cuts used require further processing into consumer portions. Also the next requires re-exposure to oxygen to resume a red rather than purple colouration.

It has been found that chilled meat packaged under carbon dioxide is resistant to spoilage by aerobic bacteria. Anaerobic bacteria which may still survive under Carbon dioxide do not flourish below 2° C., which is above the storage temperature of most chilled meat products. Evidence suggests that a relatively high concentration of carbon dioxide will actively suppress the bacterial growth—the shelf life of Carbon dioxide packaged meat is thus much longer than for vacuum packed meat.

Like the vacuum packed product, meat stored under carbon dioxide will rebloom on exposure to oxygen, giving the red coloration which consumers associate with freshness. However, it is also believed that the display life, in the oxygenated state, of carbon dioxide packaged meat is longer than that of vacuum packed meat. This may be associated with the low oxygen concentration throughout the product lifetime, which is a key requirement of the carbon dioxide process.

The use of low oxygen/high carbon dioxide packaging is well known, as is the use of oxygen absorbing compositions with meat products. Combinations of the two systems are also known. However, many problems remain.

For instance systems which release carbon dioxide are well known. Of note is the work of Benedict, Strange, Palumbo and Swift (Journal of Agricultural and Food Chemistry, 23 (6) 1202–1208 1975). Gas permeable sachets consisting of citric acid and sodium bicarbonate were added to retail package of meat and the carbon dioxide released helped to extend shelf life. Codimer also patented a system where carbon dioxide and/or oxygen were generated in a package from the reaction of citric acid with sodium bicarbonate and/or sodium perborate (EP O 128 795 (1984)).

A number of other systems also appear in the prior art which both absorb oxygen and liberate carbon dioxide. These systems were designed to replace the oxygen absorbed from within the head space of the package with high levels of carbon dioxide. For example, Toppan claims highly specific compositions such as:
100 parts ferrous chloride
20–100 parts sodium bicarbonate
5–50 parts water supplying substance
0–10 parts absorbent
0–70 parts iron powder No examples or disclosure is provided within this patent which produce large amounts of carbon dioxide and absorb small amounts of oxygen (U.S. Pat. No. 4,384,972 (1983)).

Mitsubishi described a system where the amount of carbon dioxide generated may be independent of the amount of oxygen absorbed. However the teaching of this specification limits the amount of carbon dioxide produced per mole of oxygen absorbed (U.S. Pat. No. 4,726,722 (1988)).

However the prior art fails to address the problems associated with the packaging of meat, and especially the packaging of meat in retail ready tray-based packages. The Mitsubishi system was intended to be used for sealing a package without evacuation or gas flushing and in its place greater than two moles of carbon dioxide per mole of oxygen absorbed was said to lead to pack deformation. At the time of this patent the prior art also considered that carbon dioxide gas flushing when packaging meat resulted in unwanted browning. Accordingly the art considered, and this is reflected in the limitations of the art, the excessive carbon dioxide, such as would also result through carbon dioxide gas flushing, was undesirable. However it has since been found that this browning is not due to carbon dioxide but rather to the incomplete removal of oxygen from within the package and may be a temporary condition, depending upon the levels of enzyme activity which relates to time post mortem.

Other prior art, such as EP O 527,228 (Toppan) describes oxygen absorbers/carbon dioxide generators such as mixtures of ascorbic acid and ferrous chloride. However the quantity of carbon dioxide released is dependent upon the amount of oxygen absorbed as well as on the pH of the composition. The pH may be determined by the addition of an alkali such as sodium bicarbonate, sodium carbonate of calcium hydroxide. However this disclosure is targeted to applications where a set amount of carbon dioxide and nitrogen is required within a container (e.g. container for growing bacteria samples). This, and the known prior art, fail to address the need of package meat for extended periods of time, and be able to regenerate or preserve a consumer acceptable red colouration at the retail level. In addition, there is a need, for retail ready packs, to prevent deformation of a pack due to variations in the internal atmosphere. These problems arise due to the fact that meat will absorb large quantities of carbon dioxide, generally within the first 48 hours of exposure. As this absorption process proceeds, the internal pressure of a package is reduced, unless there is a sufficient excess of carbon dioxide to completely saturate the meat, and there is a suitable mechanism by which the volume of the package may contract.

If meat is placed on a conventional sized tray, evacuated, gas flushed with carbon dioxide and the sealed under a barrier film, severe distortion will occur as the carbon dioxide is absorbed and the internal pressure of the system is reduced. This is because the volume of the tray cannot contract in a controlled manner like that of a bag, and because insufficient carbon dioxide is present to compensate for what is absorbed by the meat.

This problem becomes more noticeable as an attempt is made to keep a high product volume in relation to the volume of the package. High product to package volume systems are used conventionally (i.e. PVC overwrapped product on an expanded polystryene tray) for retail display of meat cuts.

Large volume packages containing a low volume of product are resented by consumers, who associate them with excessive packaging and waste. They are also unpopular with retailers as they occupy excessive shelf space, and also with exporters/distributors because of their high volume and low weight.

It would therefore be desirable to provide a system whereby the long storage life and display life of low oxygen/high carbon dioxide packaging could be applied to individual tray or bag wrapped systems, whilst maintaining the low volume associated with the conventional retail meat packaging systems.

It would also be desirable to modify the existing low oxygen/high carbon dioxide packaging in such a manner that the absorption of carbon dioxide by the meat cuts is matched by the generation of carbon dioxide by chemical means. The existing packaging system involves first wrapping the meat cuts in absorbent material, and then placing a number of them in a carton lined with a high barrier bag. The bag is then evacuated, flushed with carbon dioxide and sealed. Frequently the carton is not sealed for a further 24 hours so that most of the carbon dioxide can be absorbed and the final package volume is relatively low. For beef, one liter of carbon dioxide is recommended for each kilo or meat. For lamb, 1.5 liters per kilo is recommended. This delay in sealing the cartons is a source of frustration at the meat plants.

When meat is vacuum packed "drip" is drawn to the surface and will accumulate in areas where there is no intimate contact. This detracts from the appearance of the product.

It would also be desirable to extend this concept to a variety of non meat products.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of packaging for meat in a carbon dioxide rich, oxygen low package environment, comprising the sealing of the meat in an oxygen impermeable package, and including within said package carbon dioxide generating material, and oxygen removing material, the arrangement being such that the production of carbon dioxide is not dependent upon the removal of oxygen. Sufficient carbon dioxide generating material can be included for greater than 2 times the mole ratio of oxygen able to removed by the included oxygen removing material.

According to another aspect of the present invention there is provided a method, substantially as described above, wherein sufficient carbon dioxide generating material is included to release at least 0.1 liter of carbon dioxide, at STP, per kilogram of packaged meat.

According to another aspect of the present invention there is provided a method, substantially as described above, in which sufficient oxygen removing material is included to maintain an oxygen level, within the sealed package of 500 ppm or less throughout the storage life which may be for a period of at least 10 weeks from packaging.

According to another aspect of the present invention there is provided a method, substantially as described above, in which included carbon dioxide producing, and oxygen removing, materials are present in the form of one or more sachets or inserts positioned within the package.

According to another aspect of the present invention there is provided a method, substantially as described above, in which the package contents are separated from the carbon dioxide producing, the oxygen removing materials, by an oxygen and carbon dioxide permeable layer.

According to another aspect of the present invention there is provided a method, substantially as described above, in which the meat is positioned within a tray of an oxygen barrier material, and the tray covered with a oxygen barrier film layer, the carbon dioxide producing and oxygen removing materials being included within the covered tray before sealing.

According to another aspect of the present invention there is provided a method, substantially as described above, in which there is present an oxygen barrier seal overlying an oxygen permeable portion of the package, the removal of which allows permeation of oxygen through the oxygen barrier or impermeable layer.

According to a another aspect of the present invention there is provided a package comprising a tray or bag or other packet, a foodstuff or other item or material within the packet, an atmosphere modifying insert or inserts including carbon dioxide generating material and an oxygen removing material which are both characterised such that the production of carbon dioxide is not dependent upon removal of oxygen.

According to a further aspect of the present invention there is provided a package of meat comprising an outer oxygen impermeable package, there being included within same carbon dioxide generating material, and oxygen removing material which are both characterised such that the production of carbon dioxide is not dependent upon the removal of oxygen, and wherein at the time of packaging sufficient carbon dioxide generating material is included for greater than 2 times the mole ratio of oxygen able to removed by the included oxygen removing material.

According to another aspect of the present invention there is provided a package, substantially as described above, in which the outer oxygen impermeable package comprises an oxygen impermeable tray into which meat is placed and an overlying oxygen barrier film sealing the mouth of the tray, there being included within the package carbon dioxide generating material, and oxygen removing material, the arrangement being such that the production of carbon dioxide is not dependent upon the removal of oxygen.

According to another aspect of the present invention there is provided a package, substantially as described above, comprising an inner sealed oxygen and carbon dioxide permeable packet into which meat is sealed, positioned within an outer oxygen impermeable bag.

According to another aspect of the present invention there is provided an atmosphere modifying insert for maintaining a low oxygen, carbon dioxide rich atmosphere in a package for meat, said insert containing:

a carbon dioxide producing system, and an oxygen removing system;

the arrangement being further characterised in that the production of carbon dioxide is not dependent upon the removal of oxygen, and wherein sufficient carbon dioxide generating material is included for greater than 2 times the mole ratio of oxygen able to removed by the included oxygen removing material.

According to another aspect of the present invention there is provided an insert, substantially as described above, in which the carbon dioxide envolving system is initiated by the presence of moisture.

A problem with foodstuffs such as meat is that they can absorb large quantities of carbon dioxide. This can cause problems with packaging, and particularly the buckling of retail ready packs due to reduced internal pressure resulting from carbon dioxide absorption. Some other problems have been mentioned previously. One aspect of the present invention seeks to solve this problem by including within the package means for producing a relatively large volume of carbon dioxide while at the same time allowing for the absorption of residual oxygen from packaging, and preferably also any oxygen which permeates into the package throughout its normal lifetime. This may be addressed by including within the package means of generating carbon dioxide and absorbing oxygen. Ideally the amount of carbon dioxide generated is independent of the amount of oxygen-absorbed. Generally also, substantially greater carbon dioxide generating capacity is provided for than oxygen removal capacity. In preferred embodiments sufficient materials are included to generate more than two moles of carbon dioxide for each mole of oxygen able to be absorbed. In many cases preferred embodiments will comprise much higher ratios.

Most embodiments of the present invention will involve the use of means for liberating or evolving carbon dioxide within a package of articles, and in many instances will rely upon a chemical component or system which is able to release carbon dioxide over a period of time. The generation of carbon dioxide within the package can address the problems associated with its absorption by meat or other articles. It is envisaged that in most cases the package will be flushed or sealed under carbon dioxide during packaging. The carbon dioxide generated within the package is generally to counteract absorption by the meat or other articles—an equally serious problem would be over inflation which ruptured seals of the package. Through this internal generation of replacement carbon dioxide for that which is absorbed, curling of trays (for instance) can be minimised if not totally eliminated.

Accordingly it is preferable that carbon dioxide release is relatively slow over a continuing period of time to prevent over inflation of the package and possible release of carbon dioxide through the package material due to an excessive internal pressure. In most cases the rate of carbon dioxide release should approximate to the rate of carbon dioxide absorption by the packaged contents so that an approximate and desired internal pressure within the package is maintained. For most meats the bulk of carbon dioxide absorption will be within the first 24 hours and it may be desirable to tailor carbon dioxide release to occur predominantly over this period. There will often be an advantage in the slow but continued carbon dioxide release over a longer period to compensate for losses of Carbon dioxide permeating through the film.

The rate of carbon dioxide release may be influenced by a variety of methods. For instance, chemical system may be chosen which will, when activated, release carbon dioxide at the approximate rate. Another method is to make the rate of release of carbon dioxide responsive, or triggerable by, some condition within the package of articles. This condition might be the presence of moisture. Alternatively a system responsive to other stimuli could be used. Stimuli may include light or electromagnetic radiation in the visible and/or near visible regions, and/or electromagnetic radiation in other regions such as the RF, microwave, IR, and UV regions.

Another method is to contain the carbon dioxide evolving materials in a bag or container which limits or controls the rate of ingress of materials triggering carbon dioxide release, or to which the rate carbon dioxide release is responsive to. Secondly the bag or container may control the release of Carbon dioxide evolved within the bag or container.

A further method is to use components whose rate of generation or evolution of carbon dioxide are proportional to the internal pressure of the package. Such materials could be relied upon to maintain an approximate and desired internal pressure of carbon dioxide within the package. This could include the use of substances reversibly adsorbing carbon dioxide and these substances may be combined with other carbon dioxide generating systems such as described herein.

In addition to carbon dioxide evolution, it is desirable for there to be components or a system to remove oxygen which may be present in, or enter the package over time. Most embodiments of the present invention will incorporate such components or systems as even oxygen barrier films will allow the ingress of oxygen over a period of time (such as the period for which chilled meat is often stored). In an example to be given later, it will be shown that the absence of any oxygen removing substance or system will, in some cases, result in a higher than optimum level of oxygen being present in the package.

A wide range of oxygen absorbing or adsorbing compounds and systems are known. Whether the oxygen is absorbed or adsorbed or otherwise removed is not particularly relevant—the main aim is to ensure that there is not a level of free oxygen which could adversely affect the contents of the package.

The prior art has also investigated the use of substances and systems which consume free oxygen in a reaction liberating carbon dioxide. While such systems may be included within the present invention, it should be appreciated that such systems should not be relied upon for the sole evolution of carbon dioxide. As the oxygen levels present within a package are relatively low, such systems will be unable to product sufficient carbon dioxide to satisfy initial absorption by the packaged meat or article. Accordingly, such systems would only be useful for providing a perpetual and low volume supply of carbon dioxide during the life of the package (due to the low volumes of oxygen permeating through the package material) and thus higher volume carbon dioxide evolving systems should be relied upon.

The present invention may also include the use of water or moisture absorbing and/or adsorbing substances. This may be useful in the removal of fluids or excess humidity within the package. However, where these are combined with moisture responsive carbon dioxide evolving systems (such as the acid and carbonate systems to be described later), the affinity and capacity for moisture removal should not be such that the carbon dioxide evolution is not triggered by moisture present in the package. In some cases it may be useful to rely upon hygroscopic or deliquescent materials to draw moisture into the package yet allow sufficient moisture to be available for initiating the carbon dioxide evolution process.

The present invention may also include the use of odour absorbing and/or adsorbing components. Such substances are well known and may be incorporated into various compositions and packages according to the present invention e.g. zeolites, activated charcoals, etc.

Various compositions which may be used in various packages have been discussed. Their inclusion into packages may rely upon a variety of techniques.

For instance, according to one preferred aspect of the present invention the various components of the chosen system are incorporated into a bag or sachet. Typically this bag will be formed of a gas permeable but fluid impermeable material. This will allow gases, and usually water vapour, to pass through the walls of the bas is required. However they will prevent moisture, which is likely to be present in the package, from directly contacting the components of the bag or sachet. This will also help prevent contamination of the packaged articles by the components housed within the bag or sachet.

Micro-perforated films are one such material from which a bag may be constructed, or at least partly constructed. Other films and materials may also be relied upon and various apertures or vents to allow the required transfer of gases or vapours through the bag may be relied upon. The use of valve members may also be considered.

A modification is to use an oxygen absorbing polymer for forming the sachet/container. These may provide sufficient oxygen absorbing properties for a typical package. Other parts of a package may be made from such materials. PCT patent application No. WO 94/12590 describes one such material.

As a variation of the bag, a rigid or semi-rigid container may be produced for insertion into a package. This may be substantially inflexible which may make it more difficult to disguise within a package. It could however, conceivably be moulded in a form disguising its presence. An example would be a substantially flat tray insert upon which the meat or articles were placed. Again various valve members, vents or variously permeable portions may be relied upon to allow the necessary flow of gas and vapours.

As a further variation of this concept the components could be housed within a compartment formed into the package or tray. The same options, variations and requirements as for the bag and rigid insert are also appropriate. However a disadvantage of a compartment in an actual package material (e.g. tray) is that for manufacturing simplicity and less problems for the end user, any of the required chemicals and substances are likely to be inserted into the compartment at the time of its manufacture. However it is generally appropriate that the required compositions are included at the time of packaging the meat or articles, depending upon the shelf life of the compositions.

The quantity of composition included is generally proportional to the quantity of meat or other articles to be packaged. Unless the weight and nature of the articles to be packaged are known, it is difficult to anticipate the correct amount of composition to include. Where discrete sachets or inserts are relied upon, one or more can be inserted, as appropriate, at the time of packaging. Alternatively the inclusion of one or more sachets or inserts could be relied upon to supplement the amount contained in any prefilled compartment. It is not generally desirable to have to load free chemicals or substances into a compartment while attempting to package meat or other articles though automatic dispensers could be relied upon to inset appropriate amounts of compositions into packages or compartments.

Bags and sachets for containing various compositions may be formed individually though it is envisaged that strips or sheets of adjacent sachets may be manufactured. Typically the bags will be joined to each other but be separable by pulling or tearing. In some cases cutting may be relied upon though perforations facilitating tearing may be preferred in many instances.

Where the components of carbon dioxide evolving and oxygen removing systems are included in a single package, care must also be taken that the systems and components are compatible. In a preferred embodiment an 'organic acid with carbonate' type system is relied upon for carbon dioxide evolution. The term 'carbonate', as used to describe a component for $CO_2$ evolution, shall also include the 'hydrogen carbonates' (also known as bicarbonates). A common 'organic acid with carbonate' system of the present invention is citric acid with sodium hydrogen carbonate.

An iron (typically in the form of iron(II) sulphate) catalysed ascorbic acid system is relied upon for oxygen removal from the package. The ascorbic acid can also participate in carbon dioxide evolution though as this is not its preferred role. The resulting ascorbate (from reaction with the carbonate) is still capable of oxygen removal. However, for economy, citric acid will often be the preferred acid for removal dioxide evolution.

While a package according to the present invention may take a variety of forms, including a bag or container, it is envisaged that many retail ready embodiments of the present invention will comprise a tray with a covering film enabling the contents to be displayed in a shelf or refrigerator. The technology associated with such packaging is well known and may be relied upon in implementing such embodiments of the present invention. Technologies associated with other packaging forms which may be used with the present invention are also well known and could also be relied upon.

Modifications, for example to the package, may also be implemented. It has been mentioned previously that after packaging under carbon dioxide, meat will resume a reddish colour if re-exposed to oxygen. Accordingly, it will be necessary to introduce oxygen into the package to allow this reddening to occur. As most embodiments of the invention will have been packaged in a substantially oxygen free environment and with an oxygen impermeable covering, some means must be provided to allow oxygen to enter the package when required.

A physical opening could be created in the package, such as by the retailer breaching the integrity of the container or covering film (e.g. a knife cut, punched hole, etc.), through it is generally preferably that the package remains sealed. This leaves several possible options including the use of operable and closeable valve members to admit air. In other cases, vents which are normally closed may be revealed, perhaps by peeling off a cover layer. Other arrangements to provide a vent between the inside and outside of the package may be relied upon.

Another alternative is to rely upon the presence of an oxygen permeable film which will normally be covered during long term storage of the product under carbon dioxide. One method of use for such a film is to use an oxygen permeable film as a cover layer for the contents and to provide an oxygen impermeable layer overlying this. When it is desired to admit oxygen into the package, the covering barrier layer would be peeled or removed from the package. Such an arrangement need not only be applied as the main viewing window for the container but also in other positions on the package or tray.

A variety of highly permeable inner package could be used in the masterpack concept. One particularly useful style is as follows:

1. Meat is placed in an appropriate tray for retail presentation.
2. It is then lidded with a prepunched permeable film, the punch holes being in approximate positions so that they may be completely covered by a label or other seal at the point of sale. Alternatively lidded trays may be punched in situ on the lidding machine. Partial punch holes may also be formed so that no unwanted material contact the meat.
3. The individual trays of meat with the punched holes are stacked in a barrier bag within a carton. A sachet of the present invention is included.
4. The barrier bag is then evacuated in a chamber machine and gas flushed with sufficient Carbon dioxide to seal the carbon.

At the point of sale of the trays are removed allowing the ingress of oxygen through the punch holes. The trays are then sealed against leakage by the label or other sealant.

The punch holes allow the free circulation of gas which is necessary for efficient evacuation, gas flushing and eventual oxygenation. The labels or seals ensure a drip free container.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

By way of example and explanation several examples will now be given to illustrate various aspects of the present invention. These examples are not meant to be limiting nor are they meant to define the scope of the present invention.

EXAMPLES 1

Carbon Dioxide

In a preferred embodiment of the present invention the carbon dioxide evolving system comprises a solid acidic substance in combination with a substance reacting with said acid to release carbon dioxide. Typically the substance is a carbonate or hydrogen carbonate compound. Various mixtures of carbonates and/or hydrogen carbonates may be combined in various embodiments.

Typically, to prevent initiation of the carbon dioxide evolution process once the acid and carbonate (etc.) are mixed, all components should be solid. Accordingly, in many cases the acidic compound used will comprise an organic acid though other acidic compounds able to react with the carbonate (etc.) to release carbon dioxide are known and may be used.

In a preferred embodiment the carbon dioxide evolving system comprises citric acid in combination with sodium hydrogen carbonate. Each of these, providing they are of sufficient purity, are commonly used food additives and may be safely used in various embodiments of the present invention though other compounds may be used. Typically embodiments must comply with appropriate food contact legislation—this may place certain requirements on materials chosen for containing components and products of the Carbon dioxide evolving system; the outward passage of Carbon dioxide is required, though minimal leaching of other substances is desired.

Other carbon dioxide releasing chemical systems are known and may be incorporated in various embodiments of the present invention.

Systems in which carbon dioxide is initially adsorbed into a particular substance may also be relied upon though subsequent release of the carbon dioxide may not always be at the rate or proportion desired. In contrast many systems such as the citric acid/hydrogen carbonate system previously described are more suitable for the more rapid initial release, followed by the trailing off, reaction profile desired for most embodiments. Combining the two types of system may be useful for customising a carbon dioxide release profile with respect to time.

Suitable containing the components of a reactive composition of the type dependent upon the presence of moisture, can be used as a control for the rate of reaction. The container could therefore be configured to govern moisture ingress. The container could also govern other means of initiation (e.g. heat, light, other electromagnetic radiation).

Such combination may need to be stored in the presence of a drying agent until ready for use. Drying agents may be included to absorb small amounts of moisture which may come into contact with the components before their intended use.

The primary role of carbon dioxide generating is to replace that absorbed by articles within a package. Different package types and techniques may require different quantities of Carbon dioxide to be produced. For instance, a flexible pack which has been over-inflated with Carbon dioxide may only require the generation of a small amount of Carbon dioxide perhaps 0.1 liter Carbon dioxide (STP) per kg of meat. On the other hand, for a rigid tray of a red meat, 1.0 liter or more of Carbon dioxide (STP) per kg of meat may be required.

EXAMPLES 2

Oxygen Removal

A range of chemical and physical systems which can absorb, adsorb or otherwise remove oxygen are known. Each of these may be used in various embodiments of the present invention. Typically, for simplicity, the substances associated with the removal of oxygen from within the package will be combined with the carbon dioxide evolving substances. This requires some compatibility between the components and generally the simpler chemical or physical systems will be preferred.

In a preferred embodiment the oxygen removal system relies upon ascorbic acid whose oxidisation by free oxygen in the package is catalysed by a small amount of iron compounds. The combination of such components with the citric acid/hydrogen carbonate system described under Example 1 appears compatible in tests to date. In a further preferred embodiment, sodium carbonate or bicarbonate and citric acid are combined with finely divided iron.

Other compounds and systems able to remove oxygen from a package are also known and documented in the art. These include the chemical oxidation of inorganic compounds (e.g. of sulphites, sulphur, hydrogen, metals, boron and silicon).

Other techniques rely upon the chemical oxidation of various organic compounds (including ascorbic acid) while others have relied on the oxidation of metals and metal coated plastics. Some systems have relied upon the replacement of oxygen by carbon dioxide.

Each of the foregoing methods may all be considered for use in the present invention. As most are known in the prior art, they will not be described further herein. In some cases the compatibility with carbon dioxide evolving systems may need to be investigated, or alternatively the oxygen removers separated from the carbon dioxide evolvers.

Where separation is called for, each particular system may be maintained in its own compartment or receptacle. However, rather than having separate receptacles to be added to a package, it is perhaps preferable that the different carbon dioxide evolving and oxygen removing systems are kept within their own compartments within a single sachet. This would allow the correct proportions of oxygen removing substances to carbon dioxide evolving substances to be pre-prepared. No matter how many sachets were added to a package, the correct proportions of each system would be maintained. In some cases maintaining these proportions may not be important other than for reasons of economy of materials.

EXAMPLES 3

Sample Calculations

Take a thermoformed tray of thickness 500 microns and dimensions 25×10×5 cm.

Volume of tray is 1250 cc.

Surface area of tray is 0.06 $m^2$.

If the tray is made from PVC, a typical Carbon dioxide transmission rate is 500 cc per $m^2$ over 24 hours per 25 micron i.e. 500/20 per $m^2$ over 24 hours i.e. 25 cc per $m^2$ in 24 hours.

The surface area of the tray is 0.06 $m^2$ so we would expect to lose 1.5 cc per day.

At 0° C. permeation rate is reduced by a factor of approximately 4.2, therefore we would expect to lose 0.36 cc per day through the tray.

Over the lifetime of the package i.e 10 weeks, the Carbon dioxide loss through the tray would be 25 cc.

The oxygen transmission rate of the PVC would be 150 cc per $m^2$ over 24 hours per 25 micron, therefore the amount of oxygen entering the pack through the tray would be 7.5 cc over ten weeks.

Typical transmission rates through the peelable barrier are as follows:

Carbon dioxide-25 cc per $m^2$ 24 h.

$O_2$-5 cc per $m^2$ 24 h

The surface area of the peelable barrier is 0.025 $m^2$.

At 0° C. we would expect to lose 10 cc of Carbon dioxide, through the peelable barrier, and allow the ingress of 2.0 cc of oxygen.

Thus loss of Carbon dioxide would be limited to 35 cc over the ten week lifetime of a package. This level could be easily replaced by a Carbon dioxide generator.

The total amount of oxygen permeating into the package over a ten week period would be approximately 9.5 cc. This equates to 7,600 parts per million, which is high enough to induce spoilage of the product. (The maximum permissible oxygen level for Carbon dioxide packaging of beef is 500 ppm, which is close to the level commonly achieved by vacuum/gas flushing machines). As a result, an oxygen remover would be required with a PVC tray.

If we assume that the meat occupies two thirds of the package, and that each kilo of meat requires at least 1.5 liters of Carbon dioxide, we would need to generate 1,240 cc of Carbon dioxide. This could be generated by a sachet containing 4.65 g of sodium bicarbonate, and 3.6 g of citric acid.

EXAMPLES 4

Containment of the Compositions

Compositions such as described in Examples 1 and 2 normally will be required to be contained in some manner.

EXAMPLE 4A

Figure 1:
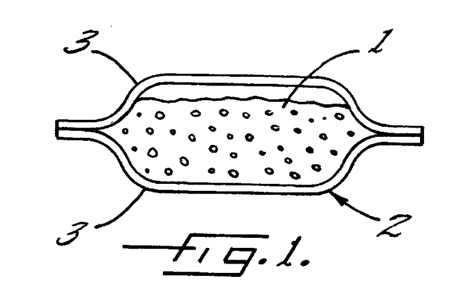
FIG. 1 is a cross-sectional diagrammatic view of a bag embodiment of the present invention.

FIG. 1 illustrates one method of containing a composition 1. Here the composition 1 is contained within a bag or sachet 2 comprising two layers 3 of a flexible material sealed at the edges. Typically the flexible material 3 must be relatively highly permeable to carbon dioxide and oxygen. If the composition 1 is moisture activated then the film 3 must also allow the permeation of water vapour even though the film may be fluid impervious.

A variety of films having the desired characteristics are known though preferred are micro-perforated-films which provide high gas permeability but fluid impermeability. Vents and apertures may also be provided in films of different types to provide the desired characteristics. Oxygen scavenging films may also be relied upon for construction of, and/or inclusion in, bags and sachets.

EXAMPLE 4B

Figure 2:
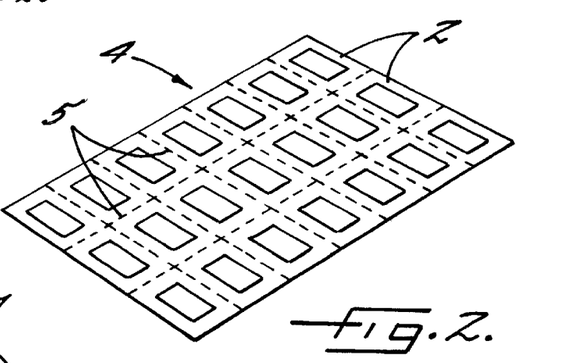
FIG. 2 is a perspective diagrammatic view of a sheet-like array of bag embodiments such as illustrated in FIG. 1.

FIG. 2 illustrates a sheet 4 of individual bags 2 which are separated by perforations 5. The perforations 5 allow individual bags or strips to be removed by pulling or treating. These can then be used as required.

Figure 8:
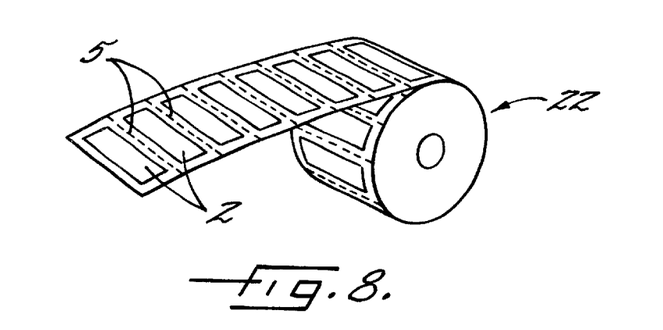
FIG. 8 is a perspective diagrammatic view of an embodiment of a roll of detachable bags of Carbon dioxide evolving material.

FIG. 8 illustrates a roll 22 of sachets 2 which may be torn off for use.

EXAMPLE 4C

Figure 3:
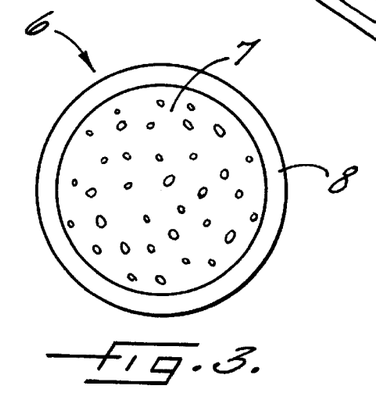
FIG. 3 is a cross-sectional diagrammatic view of a pellet-like embodiment of the present invention.

FIG. 3 illustrates a further embodiment of a composition according to the present invention. Here a pellet 6 comprising a compressed core 7 of composition is coated with a layer 8 of a suitable substance.

The coating 8 may be a dissolvable layer which gradually exposes the core for reaction. Many such compounds are known which would be suitable. However as the components of the compositions will gradually be exposed, it would be desirable to place such an embodiment inside another receptacle, e.g. instead of the loose composition 1 as shown in FIG. 1. In such an instance the coating layer 8 need not be provided if the compressed core 7 were housed within another receptacle.

As a variation a matrix comprising the desired components (for carbon dioxide generation/release and/or oxygen removal) in a dissolvable substitute may be provided. For instance a carbonate/organic acid/ascorbic acid system could be dispersed in a polyethylene oxide substrate (perhaps in a slurry using dichloromethane as a solvent) which is then formed or moulded to shape.

EXAMPLE 4D

Figure 4:
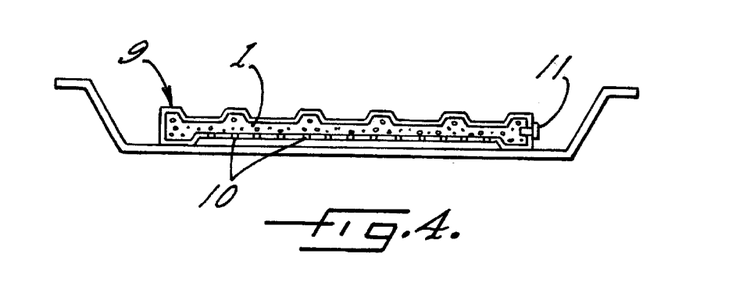
FIG. 4 is a cross-sectional diagrammatic view of another embodiment of the present invention comprising a substantially solid insert.

In FIG. 4 is shown a further embodiment of the present invention where a composition 1 is provided in a rigid or semi-rigid container 9 which can be inserted into a tray. In FIG. 4 is illustrated an embodiment where the insert 9 situated in the base portion of the tray and allows the meat or other articles to be placed on top.

The container 9 will generally be permeable to allow for at least the release of carbon dioxide and generally for the ingress of oxygen. The ingress of moisture may also be required in some instances. These features may be provided by forming the container of a suitably permeable material. Alternatively, strategically positioned vents or apertures may be relied upon, such as the base vents 10 illustrated in FIG. 4. This type of embodiment could also rely upon the use of a valve member 11 which can be self operating or set to operate when the package is filled.

EXAMPLE 4E

Figure 5:
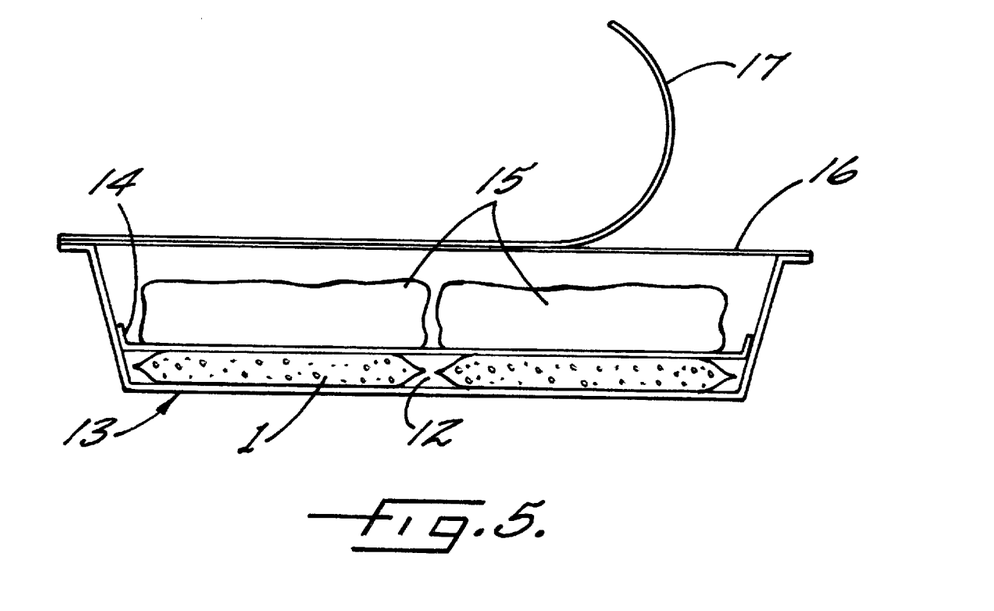
FIG. 5 is a cross-sectional diagrammatic view of an embodiment of the package according to the present invention.

FIG. 5 illustrates an embodiment of the present invention in which a compartment 12 is formed into a tray 13. While the compartment may be semi-rigid, it may also comprise a layer of a suitably permeable film 14 adhering to the sides of the tray 13. Where the compartment is integrally formed, a window of a suitably permeable film may be provided. The general requirements of permeability will allow the access and exit of components to and from the contained composition 1 have been previously discussed. Various methods of providing oxygen and carbon dioxide permeability have also been described.

The articles of meat 15 are also illustrated in FIG. 5. An upper transparent cover 16 of an oxygen permeable material such as polyethylene is also shown. Covering this oxygen permeable layer 16 is a barrier layer 17 shown in a partially peeled position. After packaging the oxygen barrier layer 17 totally covers and seals the permeable film 16. Immediately before display, where it is desired to return the red colour to meat, the barrier layer 17 is peeled back and removed from the package leaving a still sealed package in which the meat will reassume its red colour.

Figure 6:
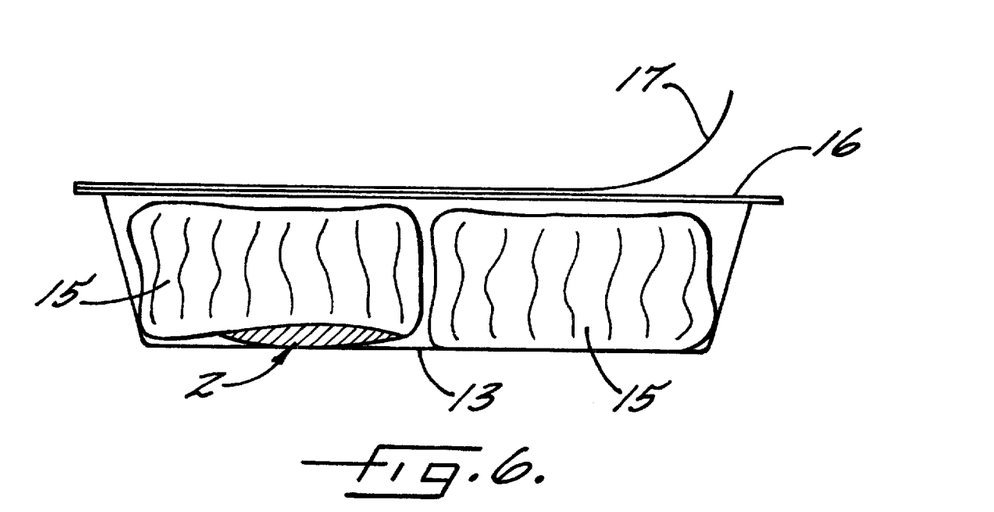
FIG. 6 is a cross-section diagrammatic view of a variation of FIG. 5.

FIG. 6 is a similar arrangement though illustrates how the films 16, 17 can help retain the packaged meat in place i.e. the height of the meat is commensurate to the height of the tray—the film (16) contacts or comes into close proximity to the meat, thereby restricting its movement.

Figure 7:
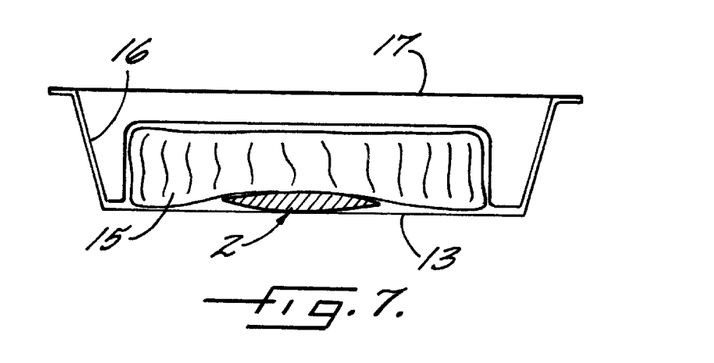
FIG. 7 is a cross-section diagrammatic view of a further variation of FIG. 5.

FIG. 7 illustrates an alternative arrangement where the product is first packed using a highly oxygen permeable vaccum skin film. This package is then evacuated, gas flushed, and lidded with an oxygen barrier film. As a further variation on this theme, the product is overwrapped in a highly permeable film (by manual or mechanical means), then gas flushed and lidded with an oxygen barrier film. The sachet 2 may be included with the meat though in a preferred embodiment film 16 is sufficiently permeable for it to be placed within the intervening region (between film 16 and 17).

EXAMPLES 5

Methods of Packaging

EXAMPLE 5A

Two sirloin steaks weighing approximately 400 g were vacuum skin packed to an amorphous PET tray using a highly permeable Intact film. The package was then evacuated, gas flushed with Carbon dioxide and sealed under a barrier lid. A perimeter seal only was applied.

The volume of the sealed tray was approximately 1.3 times the volume of the meat.

After 72 hours storage at 0° C. the tray was highly distorted because most of the Carbon dioxide had been absorbed by the meat.

Two similar steaks to the previous example were vacuum skin packed to an identical tray. A sachet consisting 4.5 g of Sample Formulation A and 5 cc of water was placed on top of the vacuum skin film. The tray was evacuated, gas flushed with Carbon dioxide, then sealed under a peelable barrier lid.

After 72 hours storage at 0° C. no distortion of the tray was evident.

The lidding film could be removed from the tray without disturbing the highly permeable skin film, allowing the product to rebloom.

A very low volume package with a storage life of up to 12 weeks at −1° C. had been produced using relatively low cost materials. The low volume of the package resulted in savings in packaging materials and distribution costs and a reduction in the amount of waste generated.

EXAMPLE 5B

A special lidding film was prepared. This consisted of an adhesive layer (for adhesion to the tray) and a highly permeable polyethylene layer weakly bonded to an oxygen barrier layer.

Two sirloin steaks weighing approximately 400 g were placed in an amorphous PET tray. The tray was evacuated, gas flushed with Carbon dioxide and sealed at the perimeter using the special lidding film.

After 72 hours storage at 0° C. the tray was highly distorted.

Two similar steaks were packaged in an identical procedure, except that a sachet comprising of 4.5 g of Sample Formulation A in a microporous film was included with the meat.

After 72 hours storage at 0° C. no distortion of the tray was evident.

The barrier layer could be removed, leaving behind a highly permeable polyethylene layer. This allowed the meat to rebloom.

These very low volume packages could be stored for up to 12 weeks at −1° C. After reblooming they were ready for retail display.

EXAMPLE 5c

Two sirloin steaks weighing approximately 400 g were placed in a 500 micron PVC tray.

4.5 g of Sample Formulation A was placed in a sachet. One side of the sachet wall had attached a pressure sensitive adhesive layer. The sachet was adhered to the tray.

The tray was evacuated, gas flushed with Carbon dioxide and perimeter sealed simultaneously under two webs. The first web consisted of an antifog containing adhesive layer for PVC and a permeable layer. The second web consisted of a peel seal layer for the outer layer of the first web and a high barrier layer such as EVOH.

The packages had excellent storage lives as in the previous examples. The barrier layer could be removed at the point of sale allowing retail display in the bloomed state.

The sachet could also be adhered to the lidding film.

In the preceding examples the sachets had enabled meats to be packed in high product to pack volume trays, under a low oxygen high carbon dioxide atmosphere. The atmosphere is highly conductive to a long storage and display life.

EXAMPLE 5d

Eight legs of lamb weighing approximately 16 kg wrapped in a moisture absorbent, gas permeable material were placed inside a foil pouch contained within a carton. The pouch was evacuated and then gas flushed, so that the carton could just be sealed (10 L of Carbon dioxide). After prolonged chilled storage the carton was opened and it was found that the pouch clung tightly to the meat cuts, as all the Carbon dioxide had been absorbed by the meat. Inadequate Carbon dioxide had been added.

A similar package was prepared, except that the foil laminate pouch was gas flushed so that 24 L of Carbon dioxide was used. The carton could not be sealed as the pouch was too large. After 24 hours chilled storage, the carton was retrieved from the storeroom and sealed, as sufficient amounts of Carbon dioxide had by then be absorbed. After prolonged chilled storage, the carton was opened and the pouch was found to be a loose fit, indicating that an adequate amount of Carbon dioxide had been added.

A larger case was used with the foregoing example where 24 L of Carbon dioxide was used in the gas flushing stage. This could be sealed, but the larger volume meant that fewer cases could be packed into a container for shipping. After prolonged chilled storage the carton was opened and the pouch was still a loose fit, indicating that an adequate amount of Carbon dioxide had been added.

Similarly, eight legs of lamb were packed in a carton as in Example I. A moisture activated carbon dioxide release/oxygen absorber sachet was prepared by sealing 100 g of Sample Formulation I into a microperforated film. The sachet was placed in the pouch which was evacuated and gas flushed with 10 L of Carbon dioxide. The sachet generated 13.8 L of Carbon dioxide and absorbed any oxygen remaining in the package. Low volume cartons has been used, and the cartons could be sealed immediately after the pouch had been sealed. After prolonged storage the pouch was found to be a loose fit indicating that sufficient gas had been added.

After one week the oxygen concentration was less than 10 ppm and this level of oxygen was retained throughout the lifetime of the package.

A similar package was prepared except that a transparent barrier bag was used in place of the foil laminate bag. No difference in product quality was observed after prolonged periods of storage. The use of an oxygen absorber had allowed the expensive foil pouch to be replaced with a cheaper coextruded bag.

Cuts of lamb (total weight of 10 kg) wrapped in a highly permeable film or in highly permeable containers were also placed in a similar pouch, which was evacuated and gas flushed with 0.5 L of Carbon dioxide per kg of meat (5 L total). A sachet consisting of 95 g of Sample Formulation H wrapped in a damp absorbent towel was added to the package. This was capable of generating 10 L of Carbon dioxide and absorbing up to 2 L of oxygen. The oxygen absorber removed residual oxygen introduced into the pouch by the retail ready packs. This allowed a masterpack of shelf ready cuts with a long storage life to be obtained. The oxygen concentration rapidly reduced to less than 10 parts per million and was retained at this level for the lifetime of the package.

Similar results were obtained with retail ready packs of beef steak.

EXAMPLE 5e

Eight legs of lamb weighing approximately 16 kg were wrapped in an absorbent material. A sachet containing 150 g of Sample Formulation I in a microporous film was added.

The pouch was evacuated and sealed. No Carbon dioxide was added.

Within two days the package was a loose fit, indicating that an excess of Carbon dioxide had been generated.

The legs of lamb had a storage life of greater than 12 weeks at −1° C. This was much better than comparable vacuum packs.

The oxygen concentration was less than 10 parts per million throughout the lifetime of the package.

A simple vacuum packaging machine had been used to produce carbon dioxide gas enriched packages similar to those produced by the Captech process.

EXAMPLE 5f

Eight legs of lamp wrapped in absorbent material were placed in a barrier pouch.

Excess air was displaced from the pouch and a sachet consisting of 128 g of Sample Formulation G was added.

The pouch was heat sealed. No vacuum or gas flushing had been used.

After seven days the oxygen concentration in the package was less than 10 parts per million.

The storage life was equivalent to that described in the previous example.

No sophisticated or expensive equipment had been used.

EXAMPLES 6

A number of sachets 2 were prepared by sealing 3 g of Sample Formulation C into a microporous film (dimensions approximately 35×35 mm).

The sachets were stored in the presence of silica gel.

Figure 9:
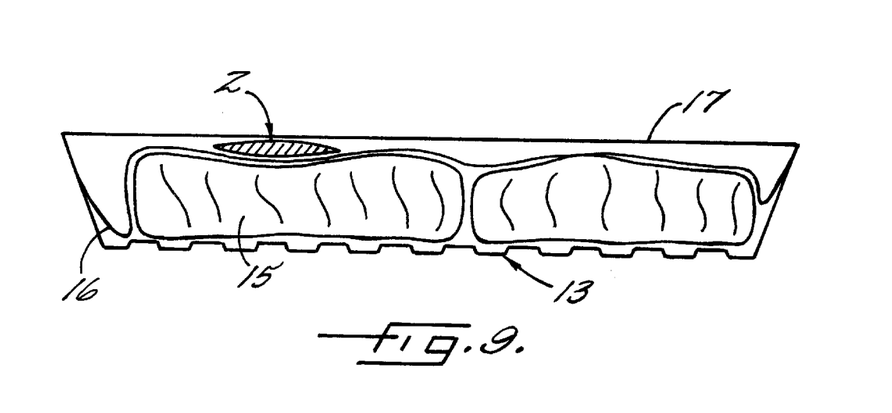
FIG. 9 is a further embodiment of the present invention.

With reference to FIG. 9, a sirloin steak 15 weighing approximately 250 g was placed in a 500 micron thick PET (polyethylene terephthalate) tray. The steak 15 was vacuum skin packaged using a highly permeable Trigon INTACT™ film 16. One sachet 2 was placed above the vacuum skin packaging film and 5 cc of water was added. The tray was then evacuated, gas flushed with carbon dioxide and sealed under a peelable barrier film.

The packages were stored at −1.5° C. for extended periods. No distortion of the packages occurred.

The peelable barrier film 17 and the sachet 2 could both be removed at the same time allowing the meat to rebloom. To the consumer, the product would appear as a bright red steak on a tray overwrapped with skin film. This embodiment would be useful for where consumer resistance to the presence of a sachet is a problem.

Like the previous examples a drip absorption system could be used to enhance package appearance.

At various intervals samples were removed from storage and compared to identical vacuum packaged steaks. These were packed at the same time using a pouch of similar permeability to the PET tray/barrier film combination used in this example. Meat packed using the system of example 6 had markedly lower bacteria counts than the vacuum packed steaks and a longer storage life. The colour in the oxygenated state was much better than for vacuum packed steaks. The meat could be packed at a processing plant and supplied direct to retail outlets, where it could be displayed in its oxygenated state without repacking.

EXAMPLE 7

Some formulations suitable for use as carbon dioxide generators and oxygen removers are as follows. These formulations may be broken down into smaller quantities for use according to the present invention. It is envisaged that for many examples the chemical systems will be present in sachets or inserts for inclusion into a package.

| | | |
|---|---|---|
| A | Sodium bicarbonate | 450 g |
|   | Fumaric acid | 288 g |
|   | $FeCl_2.4H_2O$ | 40 g |
|   | Sodium ascorbate | 210 g |
| B | Sodium carbonate | 283 g |
|   | Sodium bicarbonate | 225 g |
|   | Fumaric acid | 288 g |
|   | $FeCl_2.4H_2O$ | 40 g |
|   | Sodium ascorbate | 210 g |
| C | Sodium bicarbonate | 450 g |
|   | Citric acid | 311 g |
|   | Ascorbic acid | 60 g |
|   | $FeCl_2.4H_2O$ | 3 g |
| D | Sodium bicarbonate | 150 g |
|   | Citric acid | 51 g |
|   | EDTA | 10 g |
|   | Ascorbic acid | 50 g |
|   | $FeCl_2.4H_2O$ | 5 g |
| E | Sodium bicarbonate | 180 g |
|   | EDTA | 150 g |
|   | $FeCl_2.4H_2O$ | 50 g |
| F | Sodium bicarbonate | 130 g |
|   | Poly(acrylic acid) | 100 g |
|   | $FeCl_2.H_2O$ | 50 g |
| G | Sodium bicarbonate | 133 g |
|   | Citric acid | 102 g |
|   | Iron powder | 20 g |
| H | Sodium bicarbonate | 450 g |
|   | Fumaric acid | 288 g |
|   | $FeCl_2.H_2O$ | 100 g |
|   | Sodium ascorbate | 210 g |

-continued

| | | |
|---|---|---|
| I | Sodium bicarbonate | 450 g |
|   | Fumaric acid | 288 g |
|   | Sodium ascorbate | 53 g |
|   | $FeSO_4.H_2O$ | 10 g |
| J | Sodium bicarbonate | 450 g |
|   | Fumaric acid | 288 g |
|   | Sodium ascorbate | 355 g |
|   | $FeCl_2.4H_2O$ | 40 g |

EXAMPLES 8

Figure 10:
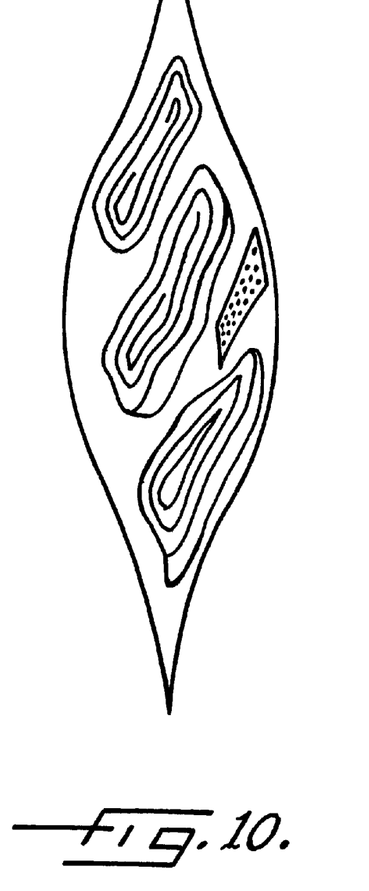
FIG. 10 is a further embodiment of the present invention comprising a barrier bag with meat.
Figure 11:
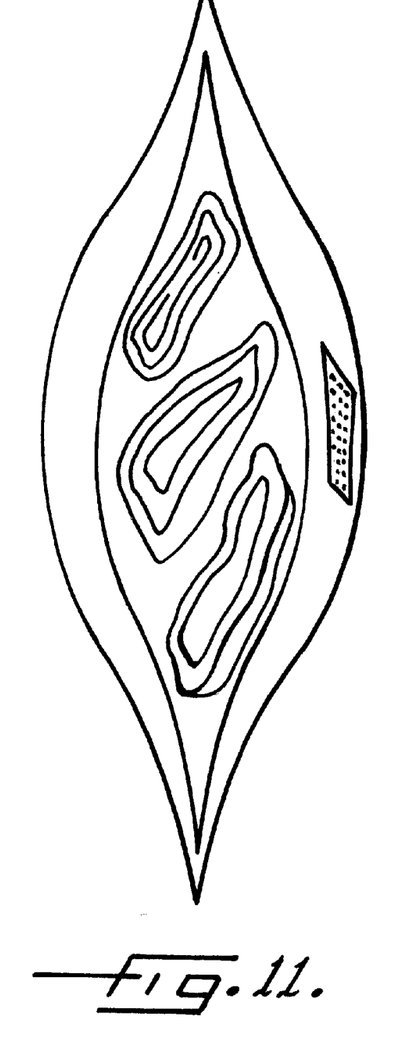
FIG. 11 is a diagrammatic view of a further embodiment of the present invention comprising an outer barrier bag, an internal permeable bag of meat products.

As a further variation FIGS. 10 and 11 illustrate alternative embodiments of the present invention. FIG. 10 illustrates a barrier outer bag containing meat product and inserts containing a carbon dioxide generating and oxygen removing substance. Preferably the included materials are able to generate carbon dioxide independently of oxygen removal and have sufficient capacity to produce at least two times as much carbon dioxide gas (measured as a molar ratio) as the ability for oxygen removal. More preferably this ratio is 5:1 or higher. The quantity of included material should also be sufficient to ensure that there is at least the ability to generate at 0.1 liters or more of carbon dioxide (measured at STP) per kilogram of enclosed meat. The meat product may be wrapped in a material known as absorber pad. A material known as "Absorba Pad" is a laminate of perforated plastics and an absorber material such as paper.

In FIG. 11 is illustrated an alternative embodiment in which the meat is packaged within an internal permeable bag. The inner bag should be permeable to both carbon dioxide and oxygen. The outer bag remains as a barrier material and ideally the carbon dioxide generating and oxygen removing material is positioned between the two bag layers.

Figure 12:
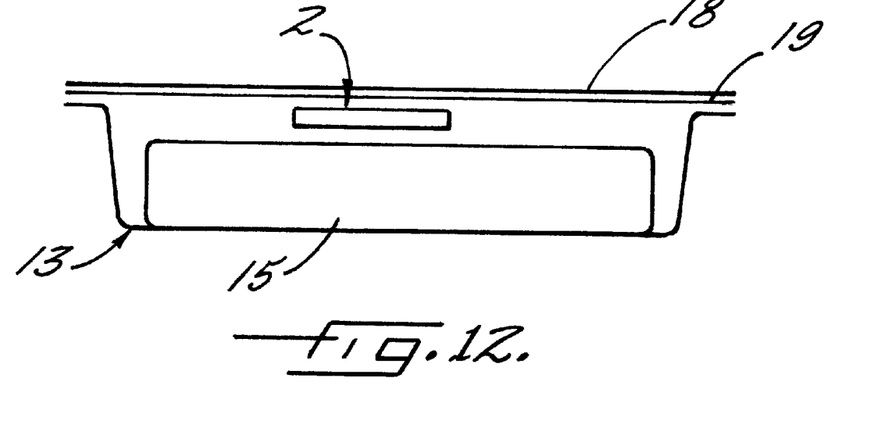
FIG. 12 is a further embodiment of the present invention.

With respect to FIG. 12 an insert 2 within a tray 13 containing meat 15 in lidded by two layers of film 18, 19, layer 18 being a barrier layer and layer 19 being a permeable layer.

Figure 13:
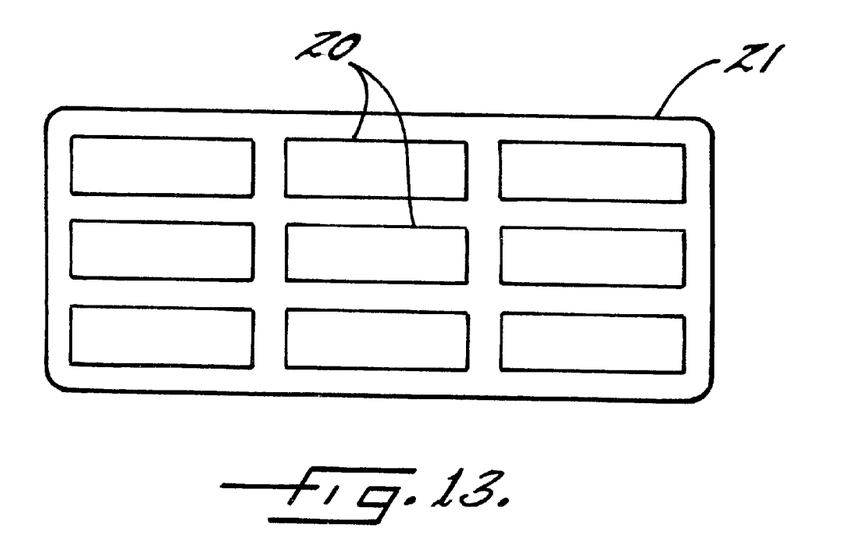
FIG. 13 shows a number of packaged articles within an impermeable bag.

FIG. 13 illustrates a number of packages 20 within a impermeable container 21. The interior of the container may be gas flushed or evacuated after loading. Packages 20 may come in many forms. For example the package may be a filled bag, it may be a skin-to-skin package, it may be a lidded tray where the tray is permeable, or any other form of composite pack.

The packages described by way of example are characterised by the fact that their is minimal air or head space, the packaging process can be completed in one step and where trays are used tray distortion is not a problem.

Aspects of the present invention have been described by way of example only and it should be appreciated that modifications and additions may be made thereto without departing from the scope thereof as defined in the appended claims.

What is claimed is:

1. A method of packaging meat or other perishable foodstuffs in a carbon dioxide rich, low oxygen package environment comprising providing a food package of a gas barrier material, placing a perishable food product which absorbs carbon dioxide within said food package, placing in said package with said food product a carbon dioxide generating material and an oxygen removing material, said oxygen removing material removing free oxygen from said package to maintain a low oxygen atmosphere within said package, evacuating said package to provide a reduced volume of air in said package when sealed, and sealed said package, said carbon dioxide generating material generating carbon dioxide in a volume greater than twice the mole ratio of oxygen removed by said oxygen removing material at a controlled rate to prevent over-inflation of said package.

2. A method according to claim 1 wherein said perishable food product is red meat and said low oxygen atmosphere contains 500 ppm or less of oxygen.

3. A method according to claim 1 wherein said package is gas flushed before sealing to provide a modified atmosphere in said package when sealed.

4. A method according to claim 3 wherein said package is gas flushed with carbon dioxide prior to sealing to provide an atmosphere therein having a carbon dioxide content higher than the carbon dioxide content of air.

5. A method according to claim 3 wherein the volume of oxygen removed by said oxygen removing material, over time, is sufficient to provide an atmosphere within said package having an oxygen content of less than 1% the oxygen content of air.

6. A method according to claim 1 wherein said package comprises a tray having a bottom and side walls defining an interior space with an open top, and an oxygen barrier film layer closing the open top of said tray.

7. A method according to claim 1 wherein said package comprises a bag of gas barrier film material.

8. A method according to claim 1 wherein the rate and volume of carbon dioxide generated is predetermined and proportional to the type and mass of the food product within said package.

9. A method according to claim 8 wherein the rate and volume of carbon dioxide generated by said carbon dioxide generating material is sufficient for absorption of carbon dioxide by the food product and to maintain a desired internal pressure within said package.

10. A method according to claim 1 wherein said carbon dioxide generating material and said oxygen removing material are confined in at least one permeable packet or sachet.

11. A method of packaging meat or other perishable foodstuffs in a carbon dioxide rich, low oxygen package environment comprising providing a food package including an outer enclosure of a gas barrier material and an interior member of a gas permeable material separating the outer enclosure into two interior spaces, placing a perishable food product which absorbs carbon dioxide in one of said interior spaces within said outer enclosure, placing a carbon dioxide generating material and an oxygen removing material in the other of said interior spaces within said outer enclosure such that gas permeable member is between the food product and said carbon dioxide generating material and said oxygen removing material, said oxygen removing material removing free oxygen from said package to maintain a low oxygen atmosphere within said package, and sealing said outer enclosure, said carbon dioxide generating material generating carbon dioxide, over time, in a volume greater than twice the mole ratio of oxygen removed by said oxygen removing material at a controlled rate to prevent over-inflation of said package.

12. A method according to claim 11 wherein said gas permeable membrane comprises a film layer coextensive with said gas barrier film layer but spaced therefrom.

13. A food package for meat or other perishable foodstuffs characterized by a carbon dioxide rich, low oxygen environment comprising a sealed enclosure of a gas barrier material having a low volume of air therein, a perishable food product which absorbs carbon dioxide confined in said enclosure, and a carbon dioxide generating material and an oxygen removing material also confined in said enclosure, said carbon dioxide generating material and said oxygen removing material, over time, removing free oxygen from the atmosphere within said enclosure to provide a low oxygen atmosphere therein and generating carbon dioxide in a volume greater than twice the mole ratio of oxygen removed to provide a carbon dioxide rich, low oxygen environment within said enclosure.

14. A food package according to claim 13 wherein said carbon dioxide generating and oxygen removing materials are confined in at least one permeable packet or sachet.

15. A food package according to claim 13 including a gas permeable member dividing said enclosure into two internal spaces and wherein the food product is confined in one of said spaces and said carbon dioxide generating and oxygen removing material is confined in the other of said spaces.

16. A food package according to claim 15 wherein said enclosure comprises a bag of a gas barrier material and said gas permeable member comprises a sealed bag in which the food product is confined.

17. A food package according to claim 15 wherein said enclosure comprises a tray having a bottom and sides defining an interior space with an open top and a closure member across the top of said tray and sealed to said tray, and wherein said gas permeable member is a film layer beneath and coextensive with said closure member.

18. A food package according to claim 13 wherein said carbon dioxide generating material is capable of generating carbon dioxide at a rate and of a volume in a predetermined proportion to the type and mass of the food product in said enclosure.

19. A food package according to claim 18 wherein said carbon dioxide generating material is capable of generating carbon dioxide at a rate of a volume sufficient for absorption of carbon dioxide by the food product and to maintain a desired internal pressure within said enclosure.

20. A food package according to claim 13 wherein said food product is red meat and said low oxygen atmosphere contains 500 ppm or less of oxygen.

21. A food package for meat or other perishable foodstuffs characterized by a carbon dioxide rich, low oxygen environment comprising a sealed enclosure of a gas barrier material having a modified atmosphere therein containing a lower oxygen content and a higher carbon dioxide content than air, a perishable food product within said enclosure, and a carbon dioxide generating and oxygen removing material within said enclosure and removing free oxygen, over time, to provide a low oxygen atmosphere in said enclosure and generating carbon dioxide, over time, in a volume greater than twice the mole ratio of oxygen removed at a controlled rate to prevent over-inflation of said enclosure whereby a carbon dioxide rich, low oxygen environment is maintained within said enclosure.

22. A method of packaging meat or other perishable foodstuffs in a carbon dioxide rich, low oxygen environment comprising provinding a food package of a gas barrier material, placing a perishable food product within said food package, placing in said package with said food product a carbon dioxide generating material and an oxygen removing material, said oxygen removing material removing free oxygen from said package to maintain a low oxygen atmosphere within said package, gas flushing said package with carbon dioxide before sealing to provide a modified, carbon dioxide rich atmosphere in said package when sealed, and sealing said package, said carbon dioxide generating material generating carbon dioxide in an amount greater than twice the mole ratio of oxygen removed by said oxygen removing material at a controlled rate to prevent over-inflation of said package.

* * * * *

UNITED STATES PATENT AND TRADEMARK OFFICE
CERTIFICATE OF CORRECTION

PATENT NO. : 6,447,826 B1 Page 1 of 1
DATED : September 10, 2002
INVENTOR(S) : Matthews It is certified that error appears in the above-identified patent and that said Letters Patent is hereby corrected as shown below:

<u>Title page,</u>
Item [57], ABSTRACT,
Line 3, "without" should read -- within --.

<u>Column 17,</u>
Example 7, in the formulations, beginning at line 42, in Formulation F, the third line of the second column, "$FeCl_2.H_2O$" should read -- $FeCl_2.4H_2O$ --.

<u>Column 19,</u>
Line 5, "sealed" should read -- sealing --;
Line 56, after "that" insert -- said --.

<u>Column 20,</u>
Line 2, "membrane" should read -- member --;
Line 45, after "rate" insert -- and --.

Signed and Sealed this

Twenty-sixth Day of August, 2003

JAMES E. ROGAN
*Director of the United States Patent and Trademark Office*